United States Patent
Lee et al.

(10) Patent No.: US 12,105,297 B2
(45) Date of Patent: *Oct. 1, 2024

(54) OPTICAL MOUSE AND LIGHT PIPE THEREOF

(71) Applicant: PixArt Imaging Inc., Hsin-Chu County (TW)

(72) Inventors: Hun-Kwang Lee, Penang (MY); Sai-Mun Lee, Penang (MY); Priscilla Tze-Wei Goh, Penang (MY); Lye-Pin Chu, Penang (MY)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,884

(22) Filed: Aug. 21, 2023

(65) Prior Publication Data
US 2023/0393407 A1   Dec. 7, 2023

Related U.S. Application Data

(63) Continuation of application No. 17/743,036, filed on May 12, 2022, now Pat. No. 11,774,771, which is a continuation of application No. 17/246,938, filed on May 3, 2021, now Pat. No. 11,372,255, which is a continuation of application No. 16/503,711, filed on Jul. 5, 2019, now Pat. No. 11,029,527.

(51) Int. Cl.
*G02B 27/09*   (2006.01)
*G06F 3/03*    (2006.01)
*G06F 3/0354*  (2013.01)

(52) U.S. Cl.
CPC ....... *G02B 27/0994* (2013.01); *G06F 3/0304* (2013.01); *G06F 3/03543* (2013.01)

(58) Field of Classification Search
CPC ............. G02B 27/0994; G06F 3/03543; G06F 3/0304
See application file for complete search history.

(56) References Cited

U.S. PATENT DOCUMENTS

| | | | | |
|---|---|---|---|---|
| 7,068,257 | B1* | 6/2006 | Bohn | G06F 3/0317 345/166 |
| 8,259,068 | B2* | 9/2012 | Dolfi | G06F 3/0317 345/166 |
| 2002/0114162 | A1* | 8/2002 | Smith | G06F 3/0421 362/326 |
| 2005/0110776 | A1* | 5/2005 | Tan | G06F 1/3203 345/179 |
| 2005/0249449 | A1* | 11/2005 | Welch | G06F 3/0317 385/14 |

(Continued)

*Primary Examiner* — Ariel A Balaoing
(74) *Attorney, Agent, or Firm* — Bruce Stone LLP; Joseph A. Bruce

(57) ABSTRACT

An optical mouse operated with respect to an illuminated surface outside the optical mouse is provided. The optical mouse includes a light source configured to emit a light beam, and a light pipe including a first optical element and a second optical element. The light beam enters the light pipe through the first optical element, and then propagates in the light pipe from the first optical element to the second optical element without reflection, and then leaves the light pipe through the second optical element, and then illuminates the illuminated surface. The light pipe does not have any protrusion extending therefrom and attached to a front surface of the light source.

20 Claims, 5 Drawing Sheets

(56) References Cited

U.S. PATENT DOCUMENTS

| | | | | |
|---|---|---|---|---|
| 2006/0007148 A1* | 1/2006 | Theytaz | ............... | G06F 3/0317 |
| | | | | 345/163 |
| 2006/0171039 A1* | 8/2006 | Smith | ................... | G06F 3/0317 |
| | | | | 359/720 |
| 2006/0232556 A1* | 10/2006 | Chien | ................... | G06F 3/0317 |
| | | | | 345/166 |
| 2007/0273654 A1* | 11/2007 | Chen | ................... | G06F 3/03543 |
| | | | | 345/166 |
| 2007/0285391 A1* | 12/2007 | Yokogi | ............. | G06F 3/03543 |
| | | | | 345/163 |
| 2008/0204415 A1* | 8/2008 | Jung | .................. | G06F 3/03545 |
| | | | | 257/82 |
| 2009/0244008 A1* | 10/2009 | Liu | .................... | G06F 3/03543 |
| | | | | 385/33 |
| 2016/0339736 A1* | 11/2016 | Li | ....................... | B43K 24/023 |
| 2020/0033611 A1* | 1/2020 | Lee | .................. | G02B 27/0916 |

* cited by examiner

OPTICAL MOUSE AND LIGHT PIPE THEREOF

CROSS REFERENCE TO RELATED APPLICATION

This application is a continuation application of U.S. application Ser. No. 17/743,036, filed on May 12, 2022, which is a continuation application of U.S. application Ser. No. 17/246,938, filed on May 3, 2021, which is a continuation application of U.S. application Ser. No. 16/503,711, filed on Jul. 5, 2019, the full disclosures of which are incorporated herein by reference.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an optical navigation device and, more particularly, to light guiding optics and an optical component of an optical navigation device.

2. Description of the Related Art

In a typical optical mouse, a light-emitting diode (LED) emits a light beam. The light beam is guided by a light pipe of the optical mouse to illuminate an illuminated surface on which the optical mouse is operated. A light sensor of the optical mouse receives the light beam reflected by the illuminated surface. The movement of the optical mouse on the illuminated surface can be calculated according to the output of the light sensor of the optical mouse. The image detection of the light sensor is based on the total flux and the uniformity of the light beam impinging on the illuminated surface.

Accordingly, how to enhance the total flux and the uniformity of the light beam received by the light sensor is an important issue.

SUMMARY

The present disclosure is related to a light pipe, an optical mouse, and an optical navigation device capable of improving the image detection of the light sensor of the optical mouse and the optical navigation device by enhancing the total flux and the uniformity of the light beam impinging on the illuminated surface.

The present disclosure provides a light pipe of an optical mouse operated with respect to an illuminated surface. The light pipe is configured to direct a light beam from a light source sequentially to the illuminated surface and a light sensor of the optical mouse. The light pipe includes a first optical element and a second optical element. The first optical element has an optical axis, and is configured to receive the light beam. The second optical element has a planar surface through which the optical axis of the first optical element passes, and a normal of the planar surface is not parallel to the optical axis of the first optical element. The light beam propagates in the light pipe from the first optical element to the second optical element without reflection, and then leaves the light pipe through the second optical element to illuminate the illuminated surface.

The present disclosure provides an optical mouse operated with respect to an illuminated surface. The optical mouse includes a light source configured to emit a light beam, and a light pipe including a first optical element, a second optical element, and a holder. The second optical element has a planar surface through which an optical axis of the first optical element passes, and the planar surface of the second optical element is arranged in a way that a first angle, with respect to a normal of the illuminated surface, of the light beam entering the planar surface of the second optical element is larger than a second angle, with respect to the normal of the illuminated surface, of the light beam leaving the planar surface of the second optical element. The light beam enters the light pipe through the first optical element, and then propagates in the light pipe from the first optical element to the second optical element without reflection, and then leaves the light pipe through the second optical element, and then illuminates the illuminated surface. The holder has an internal space configured to receive and hold the light source.

The present disclosure provides an optical mouse operated with respect to an illuminated surface. The optical mouse includes a circuit board, a light source attached on the circuit board and configured to emit a light beam, a light sensor attached on the circuit board, and a light pipe. The light pipe includes a first optical element and a second optical element. The second optical element has a planar surface through which an optical axis of the first optical element passes, and a normal of the planar surface of the second optical element is not at a same plane as that of the first optical element. The light beam enters the light pipe through the first optical element, and then propagates in the light pipe from the first optical element to the second optical element without reflection, and then leaves the light pipe through the second optical element, and then illuminates the illuminated surface. The light sensor is configured to receive at least a part of the light beam reflected or scattered by the illuminated surface.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts. The separate embodiments in the present disclosure below may be combined together to achieve superimposed functions.

Figure 1:
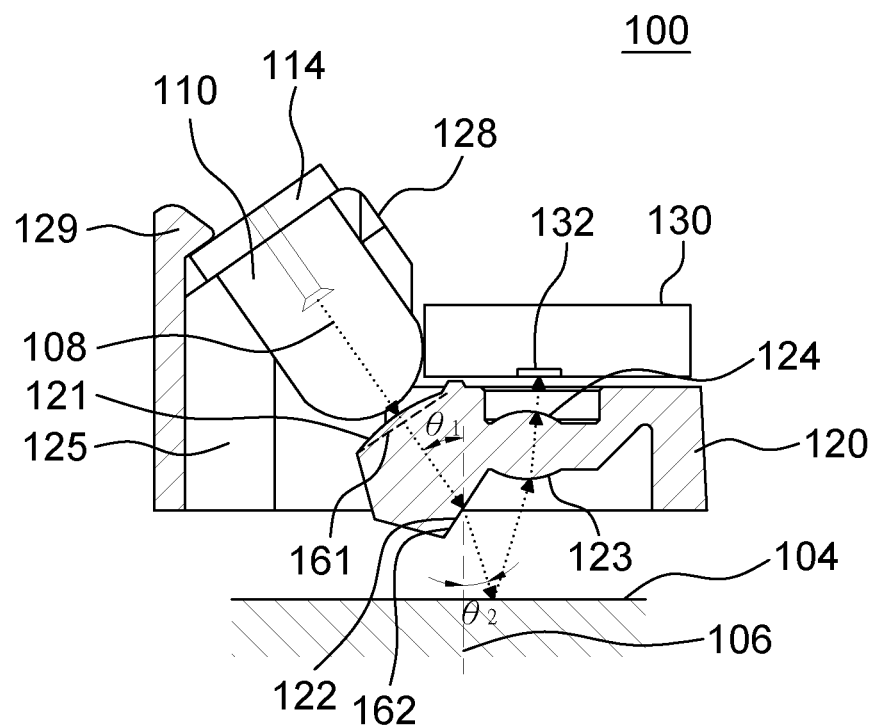
FIG. 1 is a schematic diagram showing propagation directions of a main light beam inside an optical mouse according to an embodiment of the present disclosure.
Figure 2:
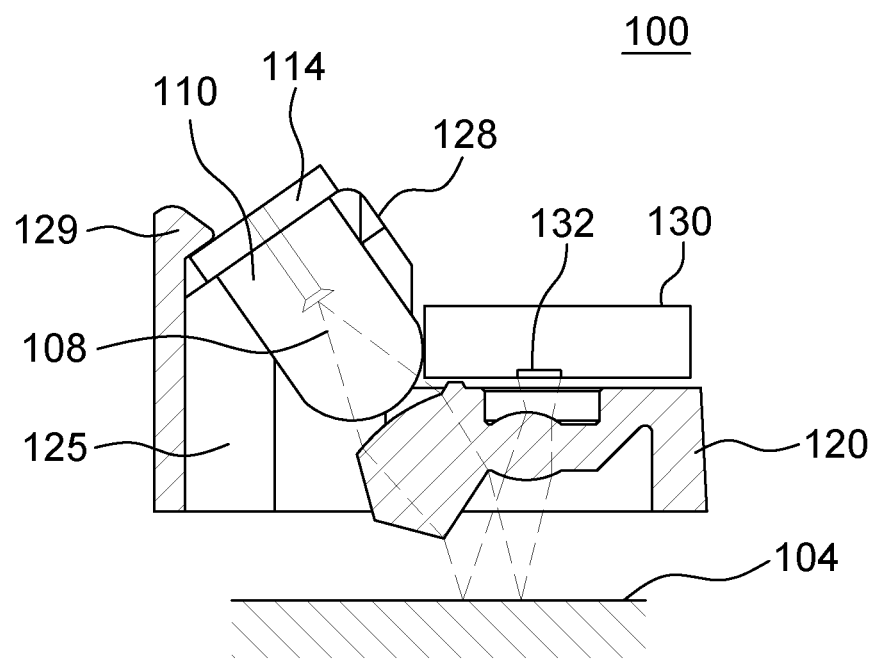
FIG. 2 is a schematic diagram showing a propagation path of a main light beam inside an optical mouse according to an embodiment of the present disclosure.

Please refer to FIG. 1 and FIG. 2. FIG. 1 is a schematic diagram showing propagation directions of a light beam 108 inside an optical mouse 100 according to an embodiment of the present disclosure. FIG. 2 is a schematic diagram showing a propagation path of the light beam 108 inside the optical mouse 100 according to an embodiment of the present disclosure. The optical mouse 100 is operated by a user on a working surface (referred as an illuminated surface 104 herein) to control a cursor shown on a screen (not shown).

The optical mouse 100 includes a light source 110 configured to emit light beams, a light pipe 120 including at least four optical elements (or surfaces) 121-124, and a light sensor 130 including a sensing surface 132. For illustration purposes, the light beam 108 is a main light beam emitted by the light source 110. Each one of the optical elements 121-124 is a lens (e.g., a concave or convex surface) or a planar surface. The light beam 108 enters the light pipe 120 through the optical element 121, and then propagates in the light pipe 120 from the optical element 121 to the optical element 122 without reflection, i.e., a propagation direction of the light beam 108 inside the light pipe 120 not being changed. In other words, the light beam 108 propagates in the light pipe 120 from the optical element 121 directly to the optical element 122 without passing through or interacting with any other optical element or optical surface of the light pipe 120. The light beam 108 then leaves the light pipe 120 through the optical element 122, and then illuminates an illuminated surface 104 outside the optical mouse 100. The light beam 108 reflected by the illuminated surface 104 re-enters the light pipe 120 through the optical element 123, and then propagates in the light pipe 120 from the optical element 123 to the optical element 124 without reflection, and then leaves the light pipe 120 through the optical element 124. Next, the light sensor 130 receives the light beam 108 via the sensing surface 132 of the light sensor 130. The movement of the optical mouse 100 on the illuminated surface 104 can be calculated according to the output of the light sensor 130, e.g., by comparing successive image frames output by the light sensor 130 using a processor (not shown).

The light source 110 is a light emitting diode (LED) or a laser diode (LD) for outputting an identifiable spectrum of light. The light pipe 120 is made of material transparent to the identifiable spectrum, such as plastic, polycarbonate, glass, fluorite or crystal. In an embodiment, the light pipe 120 is fabricated as a single piece, e.g., by injection molding, but not limited to. In another embodiment, the light pipe 120 is fabricated by assembling multiple separate parts. The illuminated surface 104 is the surface where the optical mouse 100 is operated on. For example, when the optical mouse 100 is put on a desk, the illuminated surface 104 is the top surface of the desk.

To not reduce the flux of light, there is no reflection inside the light pipe 120 when the light beam 108 propagates from the light source 110 to the light sensor 130. Therefore, the light beam 108 is not absorbed, attenuated or scattered by reflection, to minimize the light loss from interaction with extra surfaces and maximize uniformity of the light beam 108 at the illuminated surface 104 and the sensing surface 132 to improve the image detection of the light sensor 130.

In one aspect, the optical element 121 is a lens configured to change the shape of the light beam 108 by condensing the light beam 108 as shown in FIG. 2. In the aspect that the light source 110 emits light perpendicular to a light receiving surface of the optical element 121, the optical element 121 does not refract the light beam 108. In the aspect that the light source 110 emits light not perpendicular to the light receiving surface of the optical element 121, the propagation direction of the light beam 108 is shaped and bended as long as the bended light beam 108 directly reaches the optical element 122 without any reflection inside the light pipe 120.

In one aspect, the optical element 122 is a planar surface configured to refract the light beam 108, i.e. a surface of the optical element 122 is not perpendicular to the propagation direction of the light beam 108 inside the light pipe 120. More specifically, a base plane 161 of the optical element 121 is not parallel to a refraction plane 162 of the optical element 122, and an angle difference between the base plane 161 and the refraction plane 162 is arranged to cause an incident angle (with respect to the normal 106 to the illuminated surface 104) of the light beam 108 entering the optical element 122 to be larger than a leaving angle (with respect to the normal 106 to the illuminated surface 104) of the light beam 108 leaving the optical element 122.

The optical elements 123 is a lens configured to refract the light beam 108 and change the shape of the light beam 108 by condensing the light beam 108. The optical elements 124 is a lens configured to refract the light beam 108 and change the shape of the light beam 108 by diverging the light beam 108.

In one non-limiting aspect, the optical elements 122-124 refract the light beam 108 to direct the light beam 108 to the sensing surface 132 of the light sensor 130. The optical elements 121, 123 and 124 change the shape of the light beam 108 by condensing or diverging the light beam 108 so that the light beam 108 reflected by the illuminated surface 104 is completely received by the sensing surface 132 and substantially all of the sensing surface 132 receives the light beam 108 reflected by the illuminated surface 104. The optical elements 121-124 are configured to maximize the illumination and the uniformity of the light beam 108 on the illuminated surface 104 and the sensing surface 132 to improve the image detection at the light sensor 130.

In the embodiment shown in FIG. 1, the optical element 121 does not refract the light beam 108. The angle $\theta_1$ of the light beam 108 entering the optical element 122 is larger than the angle $\theta_2$ of the light beam 108 leaving the light pipe 120 through the optical element 122. The angle $\theta_1$ is larger than the angle $\theta_2$ and smaller than a total internal reflection angle $\theta_T$ of a material of the light pipe 120. Each of the angles $\theta_1$, $\theta_2$ and $\theta_T$ is measured relative to the normal 106 to the illuminated surface 104. For example, the angle $\theta_1$ is 35 degrees and the angle $\theta_2$ is 20 degrees. To allow the light beam 108 not being reflected inside the light pipe 120, said angle $\theta_1$ is preferably smaller than 45 degrees.

In another embodiment, the light sensor 130 is at a different position so that the path of the light beam 108 from the light source 110 to the light sensor 130 needs to be adjusted. The angle $\theta_1$ can be adjusted by adjusting at least one of the orientation of the light source 110 and the orientation of the optical element 121 to change the direction of the light beam 108 before entering the optical element 122. The angle $\theta_2$ can be adjusted by adjusting at least one of the orientation of the light source 110, the orientation of the optical element 121 and the orientation of the optical element 122. For example, the angle $\theta_2$ is in a range from 15 degrees to 25 degrees and the angle $\theta_1$ is larger than $\theta_2$ by a preset angle $\theta_P$, while the angle $\theta_P$ is at least 5 degrees. The positions of the optical elements 123 and 124 are adjusted accordingly.

In the embodiment shown in FIG. 1, the direction of the light beam 108 emitted by the light source 110 is perpendicular to the tangent plane of the optical element 121 at the point where the light beam 108 enters the light pipe 120 through the optical element 121 so that the optical element 121 does not refract the light beam 108. However, the present disclosure is not confined thereby. As mentioned above, the direction of the light beam 108 emitted by the light source 110 is not perpendicular to the tangent plane of the optical element 121 at the point where the light beam 108 enters the light pipe 120 through the optical element 121 so that the optical element 121 changes the angle of the light beam 108 by refracting the light beam 108.

In another embodiment, the optical element 121 is a lens or a planar surface. The optical element 121 is configured to refract the light beam 108 or not to refract the light beam 108 depending on the orientation or a tilted angle of the optical element 121 relative to the incident angle or emission angle of the light beam 108. The optical element 121 is further configured to change the shape of the light beam 108 by condensing or diverging the light beam 108 when the optical element 121 is a lens. The optical element 122 is a lens or a planar surface similar to the optical element 121.

In the embodiment shown in FIG. 1, the angle of the light beam 108 leaving each optical element 121-124 in order of the propagation of the light beam 108 form a decreasing sequence. Each aforementioned angle is measured relative to a normal to the illuminated surface 104. The present disclosure is not confined thereby. In another embodiment, the optical elements 123 and 124 are replaced by at least one lens. Each aforementioned lens is configured to refract the light beam 108 between the illuminated surface 104 and the light sensor 130. Each aforementioned lens is further configured to condense or diverge the light beam 108 between the illuminated surface 104 and the light sensor 130. The at least one lens is configured to shape the light beam 108 reflected by the illuminated surface 104 so that the light beam 108 reflected by the illuminated surface 104 is completely received by the sensing surface 132 of the light sensor 130 and substantially all of the sensing surface 132 of the light sensor 130 receives the light beam 108 reflected by the illuminated surface 104. The angle of the light beam 108 leaving each optical element 121-122 and the angle of the light beam 108 leaving each aforementioned lens in order of the propagation of the light beam 108 form an increasing sequence or a decreasing sequence. Each aforementioned angle is measured relative to a normal to the illuminated surface 104.

In another embodiment, the optical elements 123 and 124 are replaced by at least one planar surface configured to refract the light beam 108 between the illuminated surface 104 and the light sensor 130. The angle of the light beam 108 leaving each optical element 121-122 and the angle of the light beam 108 leaving each aforementioned planar surface in order of the propagation of the light beam 108 form an increasing sequence or a decreasing sequence. Each aforementioned angle is measured relative to a normal to the illuminated surface 104.

In an embodiment, the light pipe 120 does not include the optical elements 123 and 124. The light beam 108 reflected by the illuminated surface 104 propagates directly to the sensing surface 132 of the light sensor 130 without passing through any optical element, which means the light beam 108 reflected by the illuminated surface 104 propagates directly to the sensing surface 132 of the light sensor 130 without refraction, condensing or diverging. In this case, the light sensor 130 has multiple microlenses (not shown) for condensing the received light.

The light pipe 120 in FIG. 1 and FIG. 2 includes four optical elements 121-124. However, the present disclosure is not confined thereby. In another embodiment, the light pipe 120 includes a plurality of optical elements. Each optical element is a lens or a planar surface. Each optical element is configured to refract the light beam 108 or not to refract the light beam 108. Whether an optical element is configured to refract the light beam 108 or not depends on the orientation of that optical element relative to the incident angle of the light beam 108. Each optical element is further configured to change the shape of the light beam 108 by condensing or diverging the light beam 108 when that optical element is a lens. The optical elements are configured to control the direction (angle) and the shape of the light beam 108 to maximize the illumination and the uniformity of the light beam 108 on the illuminated surface 104 and the sensing surface 132 to improve the image detection at the light sensor 130.

In an embodiment, the light beam 108 emitted by the light source 110 is bright enough so that the sensing surface 132 of the light sensor 130 only needs to receive a part of the light beam 108 reflected by the illuminated surface 104.

In an embodiment, the light beam 108 emitted by the light source 110 is bright enough so that the sensing surface 132 of the light sensor 130 only needs to receive a part of the light beam 108 scattered by the illuminated surface 104 (or referred to as dark arrangement). The light pipe 120 does not need the optical elements 123 and 124 to direct the light beam 108 to the sensing surface 132.

Figure 3:
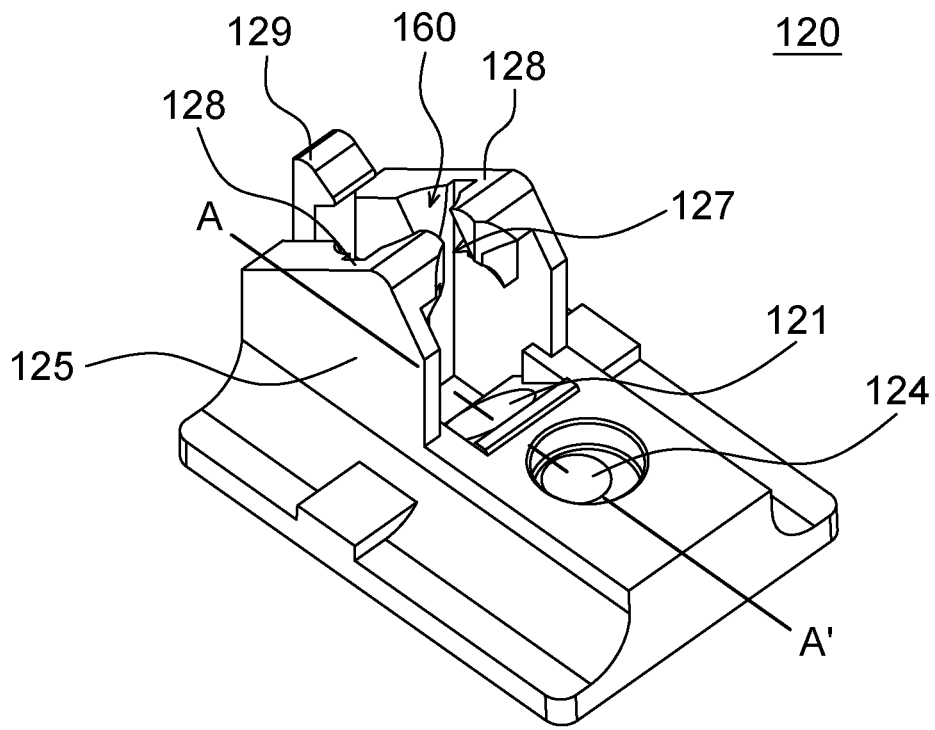
FIGS. 3-5 are schematic diagrams showing a light pipe of an optical mouse at various view angles according to an embodiment of the present disclosure.
Figure 4:
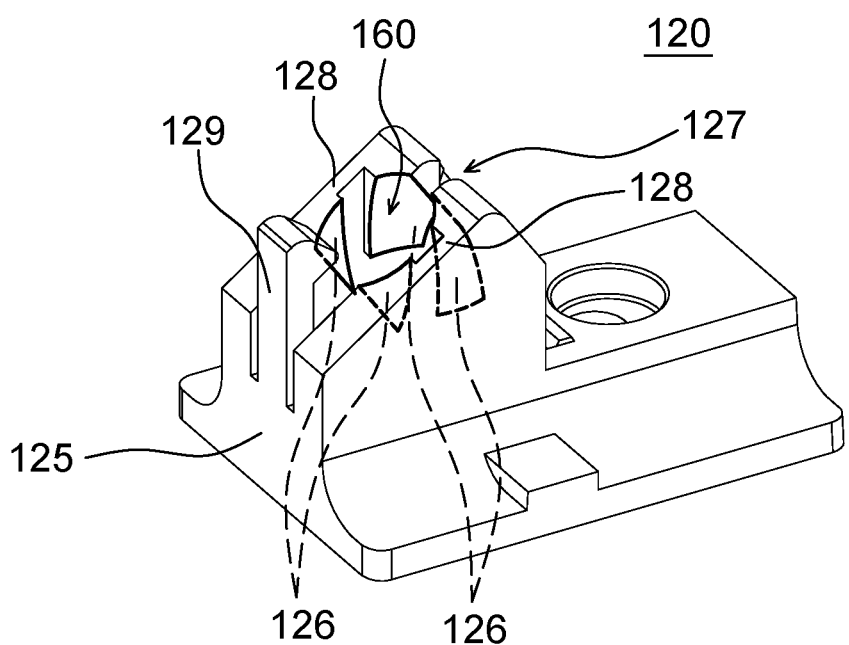
Figure 5:
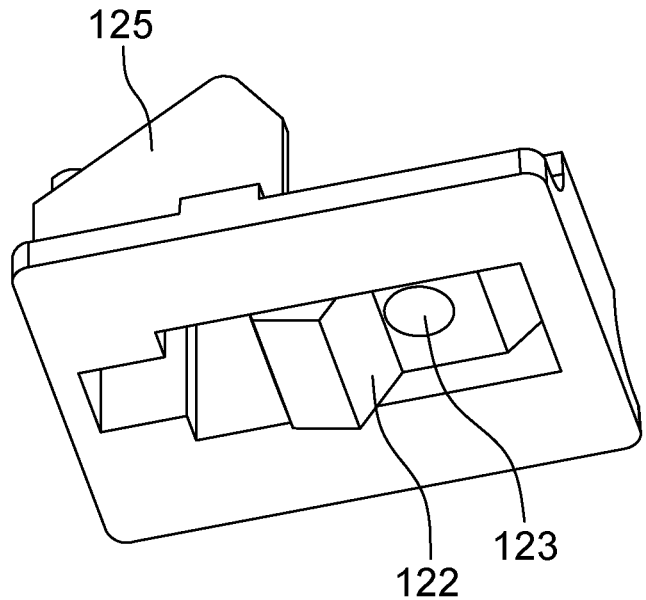
Figure 6:
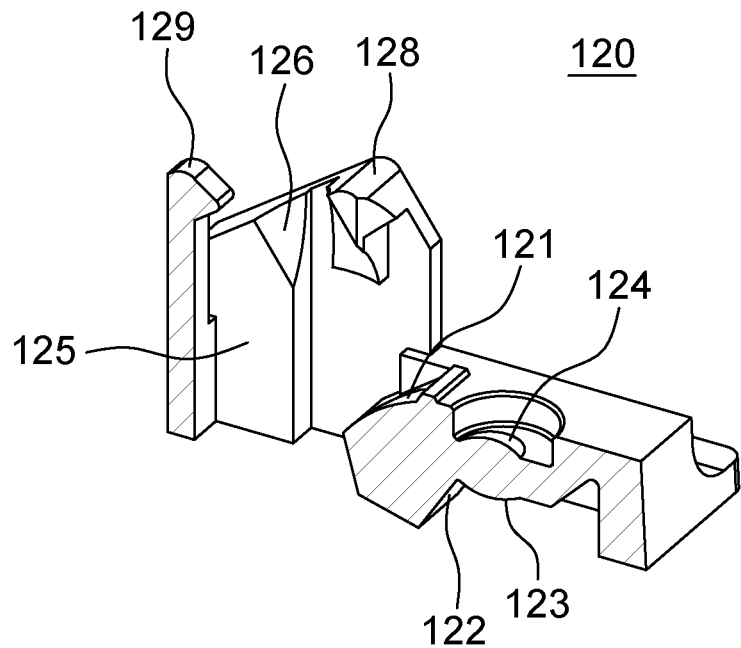
FIG. 6 is a cross-sectional view of a light pipe of the optical mouse in FIG. 3 along line A-A' according to an embodiment of the present disclosure.

Please refer to FIGS. 3-6. FIGS. 3-5 are schematic diagrams showing the light pipe 120 of the optical mouse 100 at various view angles according to an embodiment of the present disclosure. FIG. 6 is a cross-sectional view of the light pipe 120 of the optical mouse 100 in FIG. 3 along line A-A' according to an embodiment of the present disclosure. The light pipe 120 further includes a holder 125 having an internal space 160 configured to receive and hold the light source 110 to maintain the position and the angle of the light beam 108 so that the optical elements 121-124 of the light pipe 120 can direct the light beam 108 to the sensing surface 132 of the light sensor 130 with minimum loss. The holder 125 of the light pipe 120 is either opaque or transparent to the light spectrum of the light source 110.

The holder 125 includes four holding surfaces 126 surrounding the internal space 160 (namely, surrounding the light source 110) and configured to resist against the movement of the light source 110 along any direction perpendicular to the direction of the light beam 108 emitted by the light source 110.

The present disclosure is not confined to just four holding surfaces 126. In another embodiment, the holder 125 includes at least one holding surface 126. The number of the at least one holding surface 126 can be adjusted to be less than four or more than four.

In an embodiment, the holder 125 is made of a flexible material, such as plastic or polycarbonate. The holder 125 further includes a slit 127 adjacent to the internal space 160. The slit 127 is configured to enable the holder 125 to expand to accommodate a plurality of sizes of the light source 110. When the holder 125 receives a light source 110 larger than the internal space 160, the flexible holder 125 can expand to accommodate the light source 110. Therefore, the holder 125 is compatible with various sizes of the light source 110.

The present disclosure is not confined to only one slit 127. In another embodiment, the holder 125 includes a plurality of slits 127. The slits 127 are positioned adjacent to and around the internal space 160 so that the holder 125 and the internal space 160 can expand in response to a larger light source 110.

In another embodiment, the holder 125 has no slit 127. Since the holder 125 is made of a flexible material, the holder 125 can still expand to receive and hold a larger light source 110 without the slit 127.

Please refer to FIGS. 1-6. In one non-limiting embodiment, the holder 125 further includes two first latches 128 and a second latch 129. The slit 127 is positioned between the two first latches 128. The second latch 129 is positioned between the two first latches 128 and opposite to the slit 127. The second latch 129 is positioned at one side of the slit 127 and the first latches 128. The optical elements 121-124 are positioned at another side of the slit 127 and the first latches 128. In the aspect that the light source 110 includes a flange 114, the flange 114 is held between the latches 128 and 129. The two first latches 128 are configured to resist against the movement of the light source 110 along the direction of the light beam 108 emitted by the light source 110 by resisting against one side of the flange 114. The second latch 129 is configured to resist against the movement of the light source 110 along the direction opposite to the direction of the light beam 108 emitted by the light source 110 by resisting against another side of the flange 114.

The present disclosure is not confined to two first latches 128 and one second latch 129. In another embodiment, the holder 125 includes at least one first latch 128 and at least one second latch 129. The number of the first latch 128 can be adjusted to be one or more than two. The number of the second latch 129 can be adjusted to be more than one.

The positions of the slit 127 and the latches 128 and 129 are not confined to those shown in FIGS. 3-6. In another embodiment, the slit 127 and the latches 128 and 129 are positioned elsewhere. For example, the positions of the slit 127 and the second latch 129 can be exchanged. Alternatively, the first latches 128 can take the positions of the slit 127 and the second latch 129, while the slit 127 and the second latch 129 can take the positions of the first latches 128. Alternatively, the positions of the second latch 129 and one of the first latches 128 are exchanged. Alternatively, the positions of the slit 127 and one of the first latches 128 are exchanged.

In an embodiment, the latches 128 and 129 are omitted when the light source 110 is firmly held in place. For example, the holder 125 does not need the latches 128 and 129 when the light source 110 is firmly attached to the circuit board 140 shown in FIGS. 7-9.

In another embodiment, the entire holder 125 is omitted when the light source 110 is firmly held in place. For example, the light pipe 120 does not need the holder 125 when the light source 110 is firmly attached to the circuit board 140 shown in FIGS. 7-9.

Figure 7:
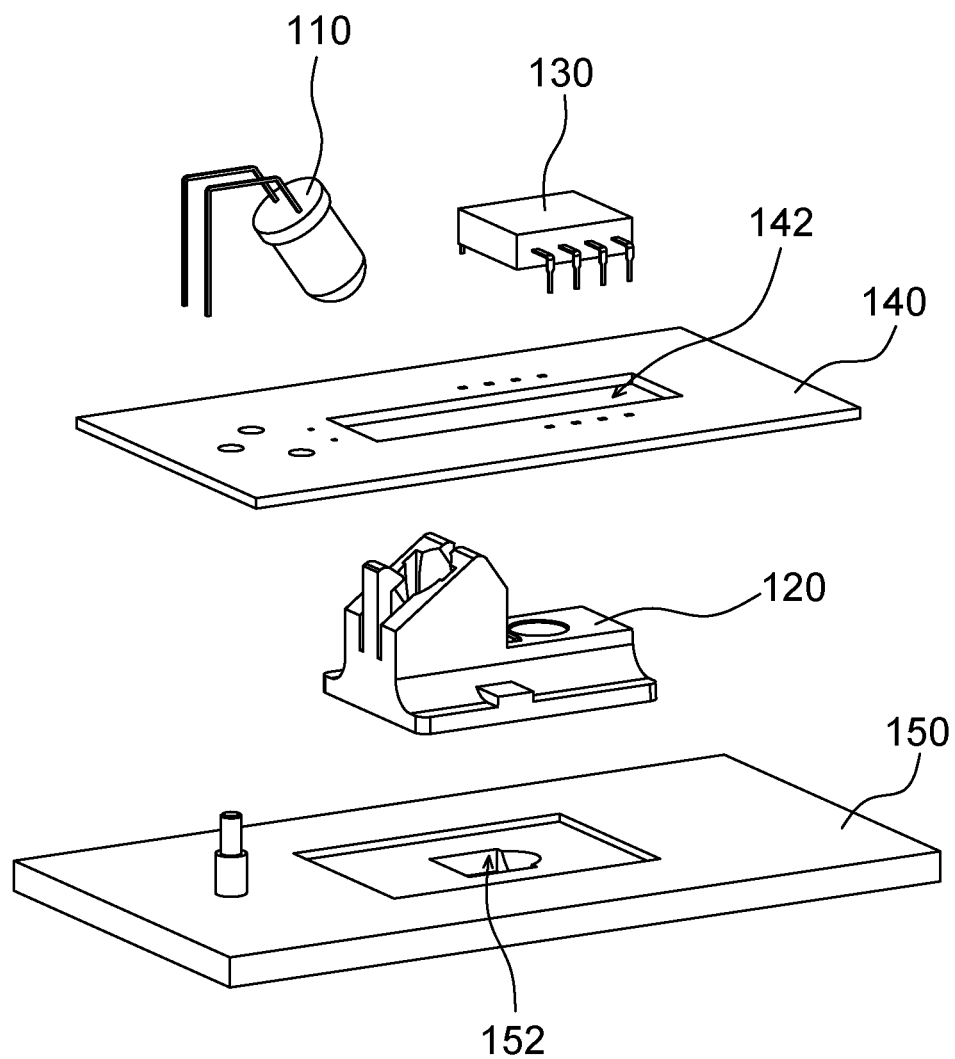
FIG. 7 is an exploded diagram showing a part of an optical mouse according to an embodiment of the present disclosure.
Figure 8:
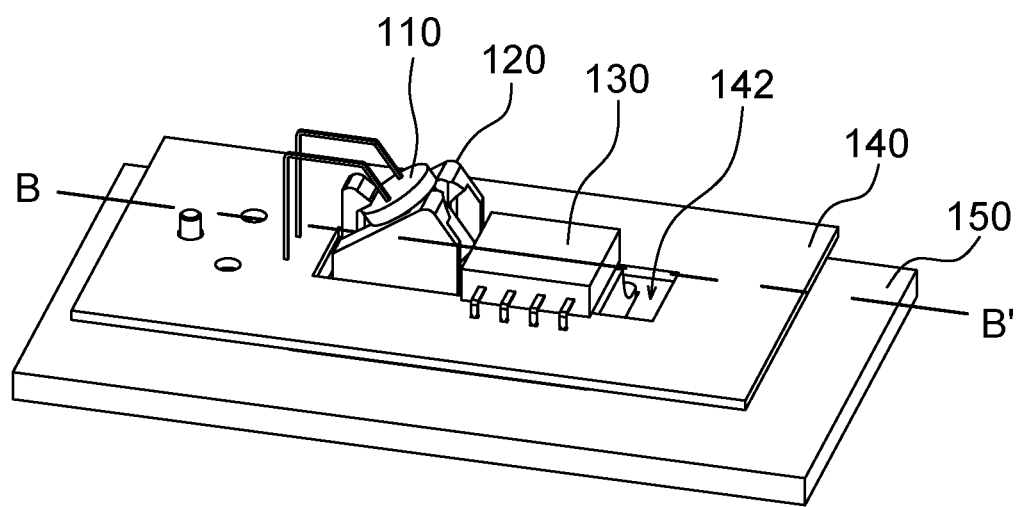
FIG. 8 is a schematic diagram showing a part of an optical mouse according to an embodiment of the present disclosure.
Figure 9:
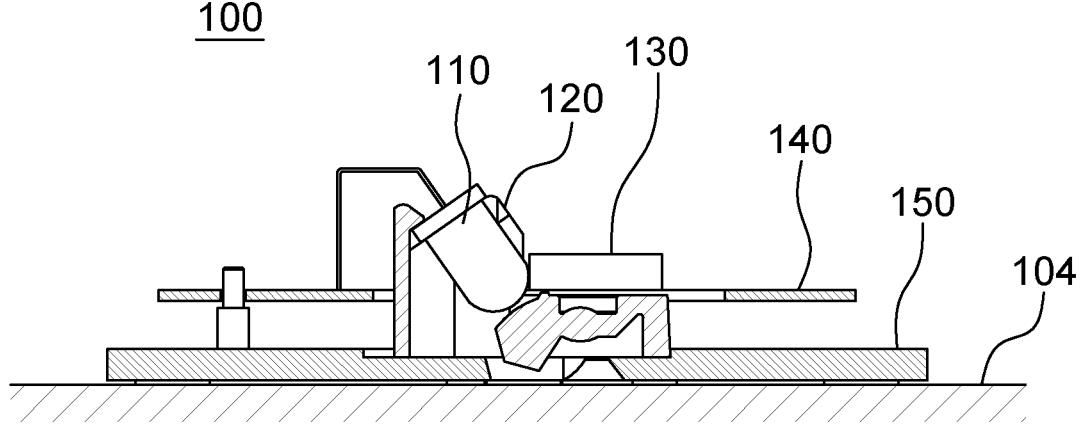
FIG. 9 is a cross-sectional view of a part of the optical mouse in FIG. 8 along line B-B' according to an embodiment of the present disclosure.

Please refer to FIGS. 7-9. FIG. 7 is an exploded diagram showing a part of the optical mouse 100 according to an embodiment of the present disclosure. FIG. 8 is a schematic diagram showing a part of the optical mouse 100 according to an embodiment of the present disclosure. FIG. 9 is a cross-sectional view of a part of the optical mouse 100 in FIG. 8 along line B-B' according to an embodiment of the present disclosure. The optical mouse 100 further includes a circuit board 140. The circuit board 140 is a printed circuit board or a flexible circuit board. The light source 110 and the light sensor 130 are attached on the circuit board 140.

The light source 110 and the light sensor 130 are both attached to the first side of the circuit board 140, and the illuminated surface 104 is at the second side of the circuit board 140 opposite to the first side. For example, the first side is the upper side of the circuit board 140 and the second side is the lower side of the circuit board 140 when the optical mouse is put on a desk.

The present disclosure is not confined to the aforementioned configuration. In another embodiment, the light source 110 and the light sensor 130 are both attached to a side of the circuit board 140. The light pipe 120 and the illuminated surface 104 are both at the same side of the circuit board 140. For example, the aforementioned side is the lower side of the circuit board 140 when the optical mouse is put on a desk.

The circuit board 140 includes an opening 142 and the light pipe 120 is positioned in the opening 142. As shown in FIG. 9, a part of the light pipe 120 is positioned at a side of the circuit board 140 and another part of the light pipe 120 is positioned at another side of the circuit board 140.

The opening 142 in FIGS. 7-9 is in middle of the circuit board 140. However, the present disclosure is not confined thereby. In another embodiment, the opening 142 is positioned on an edge of the circuit board 140.

The optical mouse 100 further includes a base plate 150 positioned between the circuit board 140 and the illuminated surface 104. The base plate 150 is a part of the housing of the optical mouse 100. The base plate 150 includes an opening 152. The light beam 108 emitted by the light source 110 illuminates the illuminated surface 104 through the opening 152. The light beam 108 is reflected by the illuminated surface 104 through the opening 152.

The opening 152 in FIG. 7 is in middle of the base plate 150. However, the present disclosure is not confined thereby. In another embodiment, the opening 152 is positioned on an edge of the base plate 150.

It should be mentioned that although in the above embodiment the working surface is illustrated by an unmovable surface, the preset disclosure is not limited thereto. In other aspects, the working surface is a moving surface, e.g., a user's finger or palm that moves with respect to the optical mouse 100.

The light pipe 120 and the optical mouse 100 can be implemented in another form in another embodiment. For example, in another embodiment, the optical mouse 100 is implemented as an optical navigation device configured to be operated with respect to the illuminated surface 104 to detect the relative movement between the optical navigation device and the illuminated surface 104, and the light pipe 120 is implemented as an optical component of the optical navigation device. The light sensor 130 is also known as the optical sensor 130 in another embodiment. The optical elements 121-124 are also known as the optical surfaces 121-124 in another embodiment.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A light pipe of an optical mouse operated with respect to an illuminated surface, the light pipe configured to direct a light beam from a light source sequentially to the illuminated surface and a light sensor of the optical mouse, and the light pipe comprising:
   a first optical element having an optical axis, and configured to receive the light beam; and
   a second optical element, wherein the second optical element includes a planar surface through which the optical axis of the first optical element passes, and a normal of the planar surface is not parallel to the optical axis of the first optical element,
   wherein the light beam propagates in the light pipe from the first optical element to the second optical element without reflection, and then leaves the light pipe through the second optical element to illuminate the illuminated surface.

2. The light pipe of claim 1, wherein
   the first optical element does not refract the light beam,
   the light beam enters the planar surface of the second optical element with a first angle with respect to a normal of the illuminated surface,
   the light beam leaves the light pipe through the planar surface of the second optical element with a second angle with respect to the normal of the illuminated surface, and
   the first angle is larger than the second angle and smaller than a total internal reflection angle of a material of the light pipe.

3. The light pipe of claim 1, wherein the first optical element is a lens configured to condense the light beam.

4. The light pipe of claim 1, wherein the light pipe does not have any protrusion extending therefrom and attached to a front surface of the light source.

5. The light pipe of claim 1, wherein the light pipe further comprises at least one surface configured to refract a reflected light beam from the illuminated surface to the light sensor.

6. The light pipe of claim 5, wherein an angle of the light beam leaving the planar surface of the second optical element and an angle of the light beam leaving said at least one surface in an order of a propagation of the light beam form an increasing sequence or a decreasing sequence, and each said angle is measured relative to a normal to the illuminated surface.

7. The light pipe of claim 1, wherein the light pipe further comprises at least one lens, and each said lens is configured to condense or diverge a reflected light beam from the illuminated surface.

8. The light pipe of claim 7, wherein the at least one lens is configured to shape the reflected light beam from the illuminated surface so that the reflected light beam from the illuminated surface is received by a sensing surface of the light sensor.

9. The light pipe of claim 1, wherein the light pipe further comprises at least one lens, each said lens is configured to refract a reflected light beam from the illuminated surface to the light sensor.

10. The light pipe of claim 9, wherein the at least one lens is configured to direct and shape the reflected light beam from the illuminated surface so that the reflected light beam from the illuminated surface is received by a sensing surface of the light sensor.

11. An optical mouse, operated with respect to an illuminated surface, the optical mouse comprising:
    a light source configured to emit a light beam; and
    a light pipe comprising a first optical element, a second optical element and a holder, wherein the second optical element includes a planar surface through which an optical axis of the first optical element passes, and the planar surface of the second optical element is arranged in a way that a first angle, with respect to a normal of the illuminated surface, of the light beam entering the planar surface of the second optical element is larger than a second angle, with respect to the normal of the illuminated surface, of the light beam leaving the planar surface of the second optical element;
    wherein the light beam enters the light pipe through the first optical element, and then propagates in the light pipe from the first optical element to the second optical element without reflection, and then leaves the light pipe through the second optical element, and then illuminates the illuminated surface, and
    the holder has an internal space configured to receive and hold the light source.

12. The optical mouse of claim 11, wherein the holder comprises at least one holding surface surrounding the internal space and configured to resist against a movement of the light source along a direction perpendicular to a direction of the light beam emitted by the light source.

13. The optical mouse of claim 11, wherein the holder comprises:
    at least one first latch configured to resist against a movement of the light source along a direction of the light beam emitted by the light source, and
    at least one second latch configured to resist against a movement of the light source along a direction opposite to the direction of the light beam emitted by the light source.

14. The optical mouse of claim 11, wherein the holder is made of a flexible material and has a slit adjacent to the internal space, and the slit is configured to enable the holder to expand to accommodate the light source of different sizes.

15. An optical mouse, operated with respect to an illuminated surface, the optical mouse comprising:
    a circuit board;
    a light source attached on the circuit board and configured to emit a light beam;
    a light sensor attached on the circuit board; and
    a light pipe comprising a first optical element and a second optical element, wherein the second optical element includes a planar surface through which an optical axis of the first optical element passes, and a normal of the planar surface of the second optical element is not at a same plane as that of the first optical element,
    wherein the light beam enters the light pipe through the first optical element, and then propagates in the light pipe from the first optical element to the second optical element without reflection, and then leaves the light pipe through the second optical element, and then illuminates the illuminated surface, and
    the light sensor is configured to receive at least a part of the light beam reflected or scattered by the illuminated surface.

16. The optical mouse of claim 15, wherein the light source and the light sensor are both attached to a first side of the circuit board.

17. The optical mouse of claim 16, wherein the circuit board comprises an opening and the light pipe is positioned in the opening.

18. The optical mouse of claim 17, wherein a part of the light pipe is positioned at the first side of the circuit board and another part of the light pipe is positioned at a second side of the circuit board opposite to the first side.

19. The optical mouse of claim 15, wherein the light source, the light pipe and the light sensor are at a same side of the circuit board.

20. The optical mouse of claim 15, further comprising a base plate positioned at a side of the circuit board, wherein
    the base plate comprises an opening,
    the light beam illuminates the illuminated surface through the opening, and
    the light beam is reflected by the illuminated surface through the opening.

* * * * *